No. 715,001. Patented Dec. 2, 1902.
J. J. BERRIGAN.
CENTRIFUGAL LIQUID SEPARATOR.
(Application filed Apr. 28, 1902.)

(No Model.)

WITNESSES:

INVENTOR

BY

ATTORNEYS

UNITED STATES PATENT OFFICE.

JOHN JOSEPH BERRIGAN, OF ORANGE, NEW JERSEY, ASSIGNOR TO THE DE LAVAL SEPARATOR COMPANY, A CORPORATION OF NEW JERSEY.

CENTRIFUGAL LIQUID-SEPARATOR.

SPECIFICATION forming part of Letters Patent No. 715,001, dated December 2, 1902.

Application filed April 28, 1902. Serial No. 104,957. (No model.)

*To all whom it may concern:*

Be it known that I, JOHN JOSEPH BERRIGAN, a citizen of the United States, residing at Orange, county of Essex, and State of New Jersey, (temporarily residing at Stockholm, Sweden,) have invented a new and useful Improvement in Centrifugal Liquid-Separators, of which the following is a full, clear, and exact description, reference being had to the accompanying drawings, which form a part of this specification.

My invention has for its object certain improvements in that class of cream-separators in which the interior of the bowl is provided with a division contrivance which intersects both vertical and horizontal radial planes of the bowl, a specific example of which class of machines is shown in United States Patent No. 432,719, dated July 22, 1890.

My invention consists in providing such class of machines with a radial partition or wing which is secured so as to rotate with the bowl and which may extend throughout the liquid-space in the bowl or only to the outer limit of the skim-milk zone. I also place the inlet or inlet opening or openings for the whole milk and the outlet opening or openings for the skim-milk upon opposite sides of this partition or wing. By this arrangement the entering whole milk is compelled to pass entirely around the bowl, and thus prolong the period of separation and fill up all the spaces formed by the division contrivances.

In the accompanying drawings I have shown my invention embodied in a machine in which the division contrivance consists of superposed vertical plates.

Figure 1:
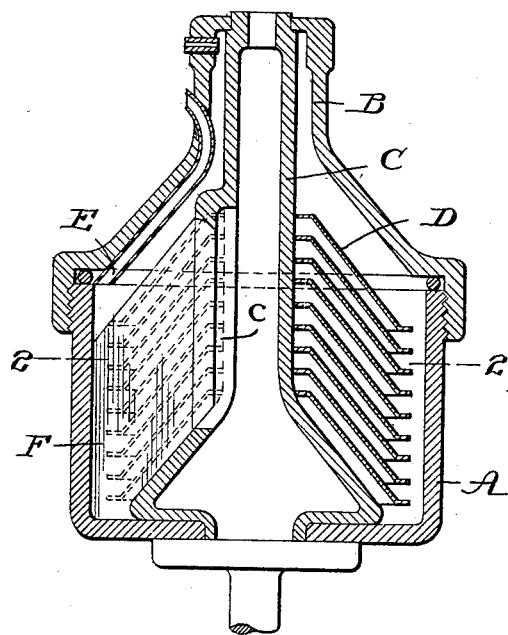
Figure 3:
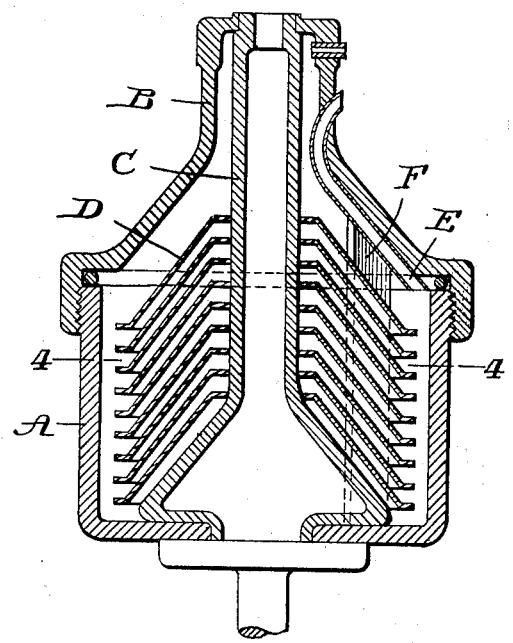
Figure 2:
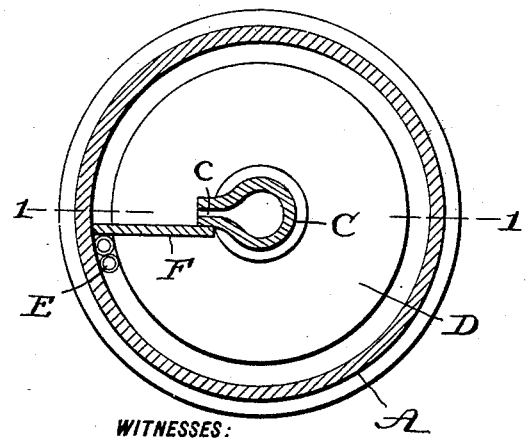
Figure 4:
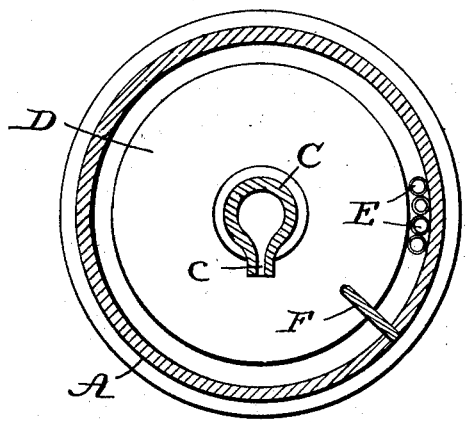

In the drawings, Figure 1 is a section of the machine on the line 1 1, Fig. 2. Fig. 2 is a section of the machine on the line 2 2 of Fig. 1 looking upward. Fig. 3 is a view similar to Fig. 1, in which the radial partition extends only through the skim-milk zone. Fig. 4 is a section on the line 4 4, Fig. 3, looking upward.

A is the body of the bowl.

B is the neck of the bowl; C, the tubular shaft into which the whole milk is delivered from the receptacle, (not shown,) having the projecting orificed discharge $c$ for the delivery of the whole milk into the bowl.

D represents the superposed conical plates forming the division contrivances.

E represents the outlet-openings for the skim-milk.

F is a radial partition secured to the inner periphery of the bowl and which in Figs. 1 and 2 extends through the liquid-space into the bowl, while in Figs. 3 and 4 it extends but slightly beyond the inner edge of the skim-milk zone of the bowl. As may be seen in both constructions, Figs. 1 and 3, the full milk is delivered at one side of the partition F and the skim-milk leaves the bowl on the opposite side of the partition. This will cause the full milk entering each space to pass entirely around the bowl and fill all the spaces and prolong the period of separation by the increased distance it travels. In order to avoid cutting through the entire surface of the disks, with its possible consequent weakening of the disks, the partition may only be extended to a point which may be called the "inner" line of the skim-milk zone, in which case the disks are but slightly cut away, while the skim-milk is still required to travel around the bowl before being discharged. With this construction last mentioned the essential part of the inner ring of milk in each space is drawn into the rotating movement of the outer ring, so that practically the whole mass turns around the bowl. With this last-mentioned construction in order to avoid the possibility of a part of the full milk which enters through the orificed discharge $c$ being carried off by the suction of the outlet-pipe E before it has been subjected to the separating process—that is, to force all the milk in course of separation to pass through each space around the bowl before it can pass to the discharge and discharge $c$—the partition F and the outlet-pipes E may be so arranged with relation to one another that a small space measured on the circumference may lie between them. As, for example, the orificed discharge $c$ may be located at about ninety degrees from the discharge-pipes E and the radial partition F about midway between them, and it may also be preferable to use several small skim-milk-outlet openings, as shown in the drawings.

Having now fully described my invention, what I claim, and desire to protect by Letters Patent, is—

1. In a cream-separator, in combination with a bowl, the interior of which is provided with a plurality of division contrivances, each at an angle to the radial line of the bowl, forming a plurality of separating-chambers intersecting both radial vertical and radial horizontal planes of the bowl, of a radial partition in the liquid-space of the bowl and rotatable with the bowl, there being a skim-milk outlet from the bowl on one side only of the partition.

2. In a cream-separator, in combination with a bowl, the interior of which is provided with a plurality of division contrivances, each at an angle to the radial line of the bowl, forming a plurality of separate chambers intersecting both radial vertical and radial horizontal planes of the bowl, of a radial partition in the liquid-space of the bowl and rotatable with the bowl, there being a whole-milk inlet to the bowl on one side of the partition and a skim-milk outlet from the bowl on the opposite side of the partition.

3. In a cream-separator, in combination with a bowl, the interior of which is provided with a plurality of division contrivances, each at an angle to the radial line of the bowl, forming a plurality of separate chambers intersecting both radial vertical and radial horizontal planes of the bowl, of a radial partition in the liquid-space of the bowl and rotatable with the bowl, there being a whole-milk inlet to the bowl on one side of the partition and skim-milk outlets from the bowl on the opposite side of the partition.

4. In a cream-separator, in combination with a bowl, the interior of which is provided with a plurality of division contrivances, each at an angle to the radial line of the bowl, forming a plurality of separating-chambers, intersecting both radial vertical and radial horizontal planes of the bowl, of a radial partition in the liquid-space of the bowl and rotatable with the bowl, said partition extending substantially to the inner line of the skim-milk zone, there being a whole-milk inlet to the bowl on one side of said partition and the skim-milk outlet from the bowl on the opposite side of the partition.

5. In a cream-separator, in combination with a bowl, the interior of which is provided with a plurality of superposed conical division-plates, of a radial partition in the liquid-space of the bowl and rotatable with the bowl, there being a whole-milk inlet on one side of said partition and a skim-milk outlet from the bowl on the other side of said partition.

6. In a cream-separator, in combination with a bowl, the interior of which is provided with a plurality of superposed conical division-plates, of a radial partition in the liquid-space of the bowl and rotatable with the bowl, said partition extending through the plates, there being a whole-milk inlet to the bowl on one side of said partition and skim-milk outlet from the bowl on the opposite side of said partition.

7. In a cream-separator, in combination with a bowl, the interior of which is provided with a plurality of superposed conical division-plates, of a radial partition in the liquid-space of the bowl and rotatable with the bowl, said partition extending from the periphery through the plates to the inner line of the skim-milk zone, there being a whole-milk inlet to the bowl on one side of said partition, and skim-milk outlet from the bowl on the opposite side of said partition.

8. In a cream-separator, in combination with a bowl, the interior of which is provided with a plurality of superposed conical division-plates, of a radial partition in the liquid-space of the bowl and rotatable with the bowl, there being a whole-milk inlet to the bowl on one side of said partition and a plurality of skim-milk outlets from the bowl on the opposite side of said partition.

In testimony of which invention I have hereunto set my hand.

JOHN JOSEPH BERRIGAN.

Witnesses:
TH. WAWRINSKY,
OTTO ROOTH.